(12) United States Patent
Dittmar et al.

(10) Patent No.: US 10,619,674 B1
(45) Date of Patent: Apr. 14, 2020

(54) BEARING ASSEMBLY

(71) Applicant: Aktiebolaget SKF, Gothenburg (SE)

(72) Inventors: Rico Dittmar, Schweinfurt (DE); Fabricio Teixeira, New Hudson, MI (US)

(73) Assignee: AKTIEBOLAGET SKF, Gothenburg (SE)

(\*) Notice: Subject to any disclaimer, the term of this patent is extended or adjusted under 35 U.S.C. 154(b) by 0 days.

(21) Appl. No.: 16/246,908

(22) Filed: Jan. 14, 2019

(51) Int. Cl.
*F16C 33/78* (2006.01)
*F16C 19/36* (2006.01)

(52) U.S. Cl.
CPC ........ *F16C 33/7876* (2013.01); *F16C 33/783* (2013.01); *F16C 19/364* (2013.01)

(58) Field of Classification Search
CPC ...... F16C 43/04; F16C 43/045; F16C 41/045; F16C 33/6681; F16C 33/80; F16C 33/805; F16C 33/783; F16C 33/7869; F16C 33/7873; F16C 33/7879; F16C 33/60; F16C 33/7886; F16C 33/7889; F16C 33/605; F16C 33/7876; F16C 19/364

See application file for complete search history.

(56) References Cited

U.S. PATENT DOCUMENTS

| | | | | |
|---|---|---|---|---|
| 2,071,198 A * | 2/1937 | Chambers | ........... | F16C 33/6655 384/484 |
| 2,779,640 A * | 1/1957 | Jones, Jr. | ............ | F16C 33/6655 384/480 |
| 4,478,463 A * | 10/1984 | Takai | ..................... | F16C 19/386 277/565 |
| 2012/0195536 A1* | 8/2012 | Metten | ................ | F16C 33/7809 384/480 |
| 2014/0355921 A1* | 12/2014 | Kuhn | ..................... | F16C 33/605 384/499 |
| 2016/0108962 A1* | 4/2016 | Miyazaki | ................ | F16C 33/80 384/473 |

FOREIGN PATENT DOCUMENTS

| DE | 102009020861 | * 11/2010 |
|---|---|---|
| JP | 2014088891 | * 5/2014 |

OTHER PUBLICATIONS

Machine translation of JP-2014088891 (Year: 2014).*
Machine translation of DE 102009020861 (Year: 2009).*

\* cited by examiner

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

A bearing assembly includes an outer ring, an inner ring, a cage between the inner ring and the outer ring, a plurality of rolling elements disposed in the cage, and at least one seal unit configured to seal an interior of the bearing assembly on one side with respect to an outer space. The seal unit includes a carrier element and an elastomer element attached to the carrier element, and a ring is mounted axially between the plurality of rolling elements and the carrier element, in the carrier element, for example, which ring is spaced from the cage and distinct from the cage.

8 Claims, 3 Drawing Sheets

BEARING ASSEMBLY

TECHNOLOGICAL FIELD

The disclosure is directed to a bearing assembly having an inner ring, an outer ring, rolling elements and a seal.

BACKGROUND

A bearing assembly (see FIG. 1) is known that includes a rolling-element bearing having an inner ring 10, an outer ring 12, rolling elements 14, and a seal 16, which seals an interior of the rolling-element bearing on one axially outer side. A ring 18 made of metal plate supports the seal 16, and the seal 16 is comprised of an elastomer. The seal 16 runs on a ring element 20 that is pressed onto the inner ring and is approximately U-shaped in longitudinal section.

SUMMARY

One aspect of the disclosure is to provide an improved bearing assembly of the above-described type.

The disclosure is directed to a bearing assembly including at least one outer ring, at least one inner ring, a number of rolling elements configured to roll on the outer ring and the inner ring, at least one seal unit that seals an interior of the bearing assembly on one of its sides opposite an exterior, and which includes at least one carrier element and at least one elastomer element attached to the carrier element.

The bearing assembly includes at least one component, such as a ring, that is axially disposed at least partially between the carrier element and at least one of the rolling elements, and which differs from a cage of the bearing assembly and a part of the cage. In other words, the component is a distinct structure from any cage that is present in the assembly and does not function as a bearing cage. The component allows for a simple securing of the inner ring on the outer ring during transport and installation of the bearing assembly, and in particular a metal ring or clip ring for this purpose can be omitted. Furthermore, lubricant is deflected by the component toward a seal surface of the elastomer element in a manner that helps reduce or eliminate lubrication deficiency and overheating of the elastomer element against the seal contact.

Further advantages arise from the following description of the drawings. Exemplary embodiments of the disclosure are depicted in the drawings. The drawings, the description, and the claims contain numerous features in combination. The person skilled in the art will also advantageously consider the features individually and combine them into further meaningful combinations.

DETAILED DESCRIPTION

Figure 1:
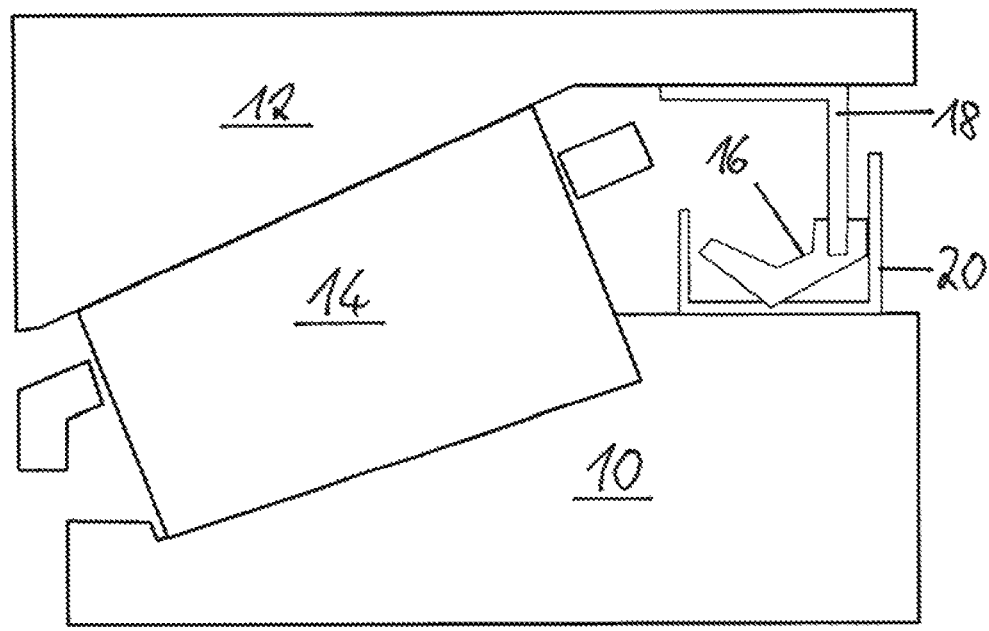
FIG. 1 is a schematic illustration of a conventional bearing assembly.
Figure 2:
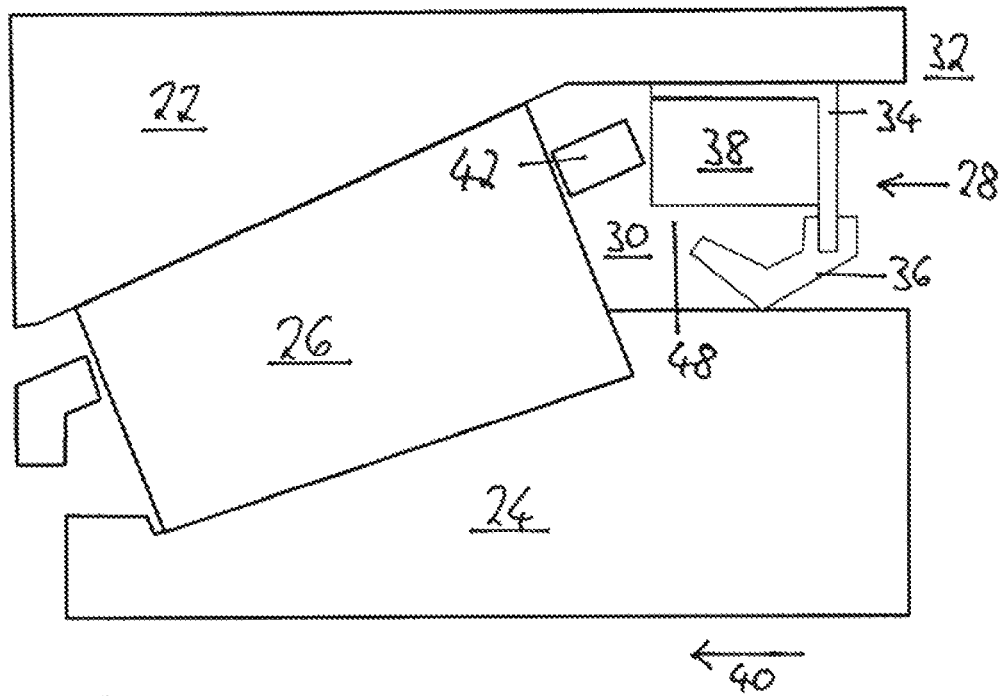
FIG. 2 is a schematic longitudinal sectional view through a bearing assembly according to an embodiment of the present disclosure which includes an additional component.

FIG. 2 shows a schematic longitudinal section through an inventive bearing assembly including an outer ring 22, an inner ring 24, rolling elements 26, which are provided for rolling on the outer ring and the inner ring, a cage 42, and a seal unit 28, which seals an interior 30 of the bearing assembly on one of its sides with respect to an exterior 32 and which includes a carrier element 34 and an elastomer element 36 attached to the carrier element. The elastomer element forms a seal lip that contacts the inner ring. Furthermore, the carrier element is configured L-shaped in longitudinal section, wherein an arm of the carrier element contacts the outer ring because the carrier element is pressed into the outer ring. A further arm of the carrier element extends radially inward starting from the first-mentioned arm, and the elastomer element is attached to its radially inner end. The seal unit 28 is comprised of the carrier element and the elastomer element. In addition, the bearing assembly includes a component 38, such as a ring, that is disposed partially between the carrier element and the rolling elements with respect to an axial direction 40 of the bearing assembly and that differs from the cage. The component 38 is pressed into the carrier element, formed one-piece from plastic, and has the shape of a hollow cylinder.

A space region 48 is located between the elastomer element 36 and the component 38, which space region 48 is free of any components and which is disposed axially further in the interior of the bearing assembly than the elastomer element 36. The space region 48 is configured such that the component 38 is spaced from the rolling elements 26 by a shorter distance than the component 38 is spaced from the elastomer element 36.

The outer ring, the inner ring, and the rolling elements form a first rolling-element bearing. The bearing assembly includes a second rolling-element bearing (not shown), which comprises a further inner ring that is not directly attached to the inner ring 24. With an installing or transporting of the bearing assembly it can occur that the inner ring 24, the rolling elements, and the cage move relative to the outer ring perpendicular to the axial direction 40. If this movement is large enough, then the cage abuts against the component, which stops the movement and thereby prevents the inner ring, the rolling elements, and the cage from falling out of the outer ring. The design made of plastic makes the component 38 particularly cost-effective.

Figure 3:
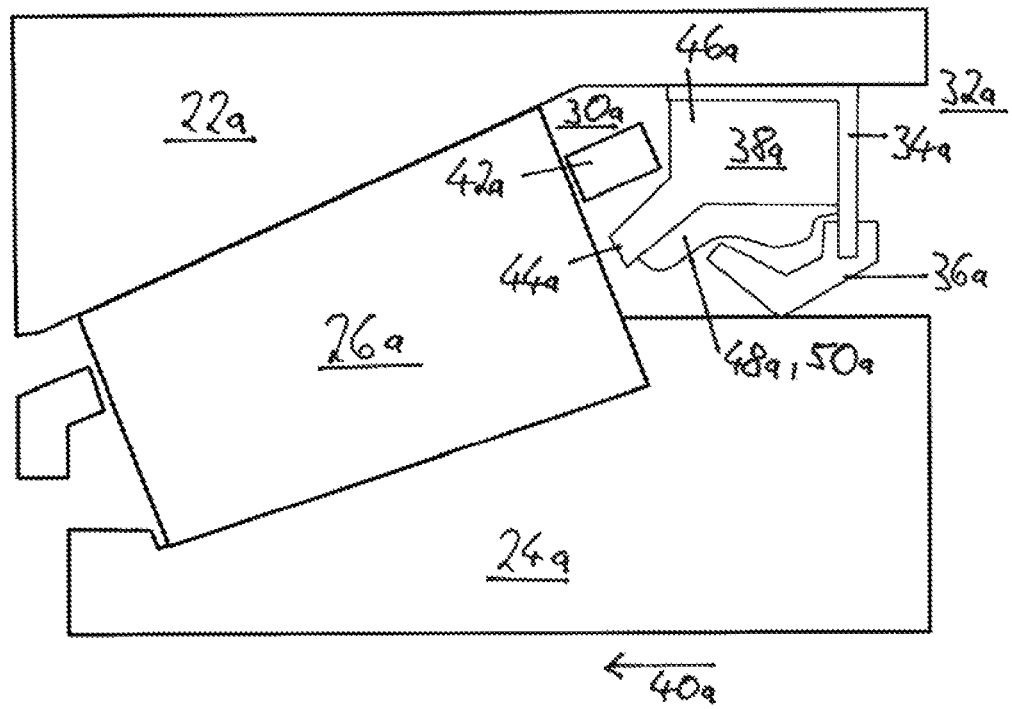
FIG. 3 is a schematic longitudinal section through a bearing assembly according to another embodiment in which the additional component includes an extension.
Figure 4:
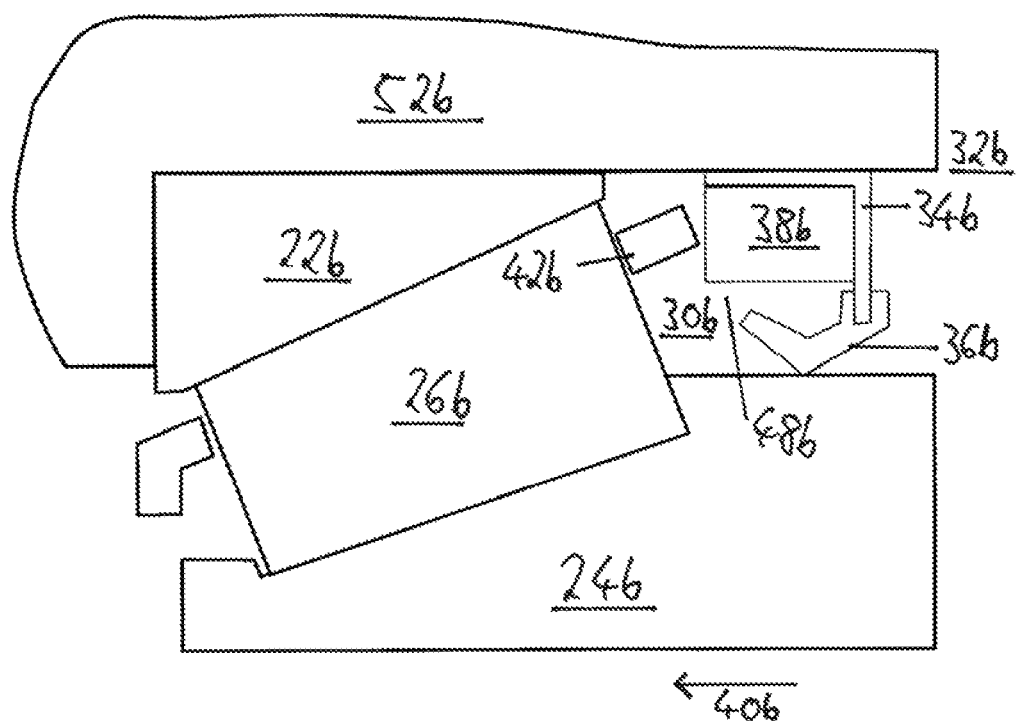
FIG. 4 is a schematic longitudinal section through a another embodiment that includes an outer ring pressed into a hub.
Figure 5:
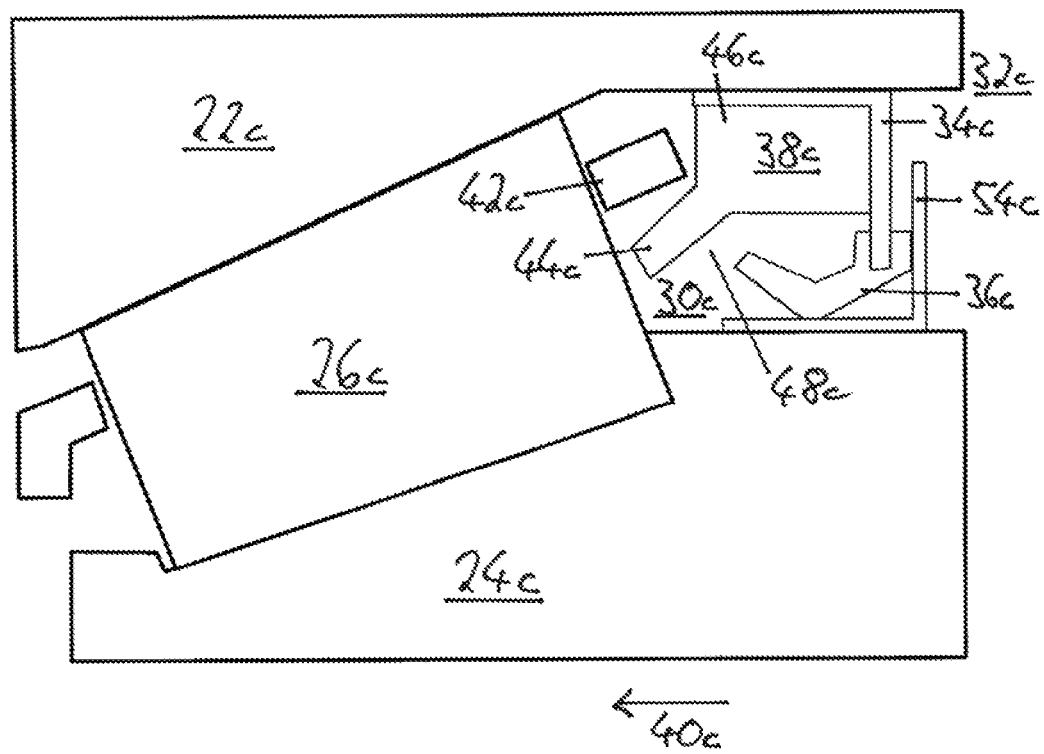
FIG. 5 is a schematic longitudinal section through another embodiment in which a seal runs on a race.

In FIGS. 3-5 alternative exemplary embodiments are depicted. Essentially identical components, features, and functions are generally numbered with the same reference numbers. However, to differentiate the exemplary embodiments the letters "a," "b," etc. are added to the reference numbers of the exemplary embodiments in FIGS. 3-5. The following description is essentially limited to the differences with respect to the exemplary embodiment in FIG. 2, wherein with respect to the identical components, features, and functions reference can be made to the description of the exemplary embodiment in FIG. 2.

FIG. 3 shows an alternative exemplary embodiment. The respective bearing assembly includes a component 38a that is comprised of a hollow cylinder-shaped base body 46a and an extension 44a that extends starting from the base body both radially inward and in axial direction 40a. Bearing assembly lubricant, in the present case oil 50a, collects in a space region between the component and an elastomer element 36a and can move radially inward from there into a region wherein the elastomer element is not disposed between the inner ring and the component. The lubricant is then available for lubricating a contact between the elastomer element and the inner ring, which causes the contact to not dry and thus overheat, and thus an effective sealing is ensured. Due to the geometry of the component the radial intermediate space between elastomer element and carrier element is greatly reduced so that an accumulating of oil in this region is avoided and consequently more oil is available for lubricating the seal contact.

FIG. 4 shows a further alternative exemplary embodiment of the invention. Here a carrier element 34b and an outer ring 22b is pressed into a hub 52b so that the carrier element directly abuts against the hub.

Of course the outer ring and a corresponding hub in the exemplary embodiment according to FIG. 3 can also be configured according to the design in the exemplary embodiment according to FIG. 4.

FIG. 5 shows a further inventive exemplary embodiment of a bearing assembly. The bearing assembly includes a race 54c that is pressed-on onto an inner ring 24c. In an axial longitudinal section the race has an L-shape. Here an arm of the race abuts with one side on the inner ring. A sealing contact occurs on this arm with an elastomer element 36c.

A second arm of the race extends radially outward starting from the first arm and forms a labyrinth seal with an arm of the carrier element 34c.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Inner ring
12 Outer ring
14 Rolling element
16 Seal
18 Ring
20 Ring element
22 Outer ring
24 Inner ring
26 Rolling element
28 Seal unit
30 Interior
32 Exterior
34 Carrier element
36 Elastomer element
38 Component
40 Axial direction
42 Cage
44 Extension
46 Base body
48 Space region
50 Oil
52 Hub
54 Race

What is claimed is:

1. A bearing assembly comprising:
an outer ring,
an inner ring,
a cage between the inner ring and the outer ring, the inner ring defining an axially extending radial surface;
a plurality of rolling elements disposed in the cage;
at least one seal unit configured to seal an interior of the bearing assembly on one axial side thereof with respect to an outer space, the seal unit comprising a carrier element and an elastomer element attached to the carrier element, the carrier element being located on a portion of the outer ring that is opposite to the axially extending radial surface on the inner ring, the elastomer element being in direct abutting contact with the axially extending radial surface;
a ring mounted axially between the plurality of rolling elements and the carrier element, the ring abutting the carrier element without a gap therebetween and being spaced from the cage, wherein the ring comprises a base body and an extension that extends radially inward from the base body and axially toward the rolling elements, when viewed in cross section the base body defines a solid shape such that no chamber is present therein; and
wherein the ring is press-fitted in the carrier element.

2. The bearing assembly according to claim 1, wherein the ring is at least partially comprised of plastic.

3. The bearing assembly according to claim 2, wherein the carrier element is configured one-piece.

4. The bearing assembly according to claim 1, wherein the ring comprises a hollow cylinder.

5. The bearing assembly according to claim 1, wherein the elastomer element is spaced from a component by a gap.

6. The bearing assembly according to claim 1, wherein a distance from the ring to the plurality of rolling elements is shorter than a distance from the ring to the elastomer element.

7. The bearing assembly according to claim 1,
wherein said ring is a one-piece ring that is spaced from the cage and from the elastomer element.

8. The bearing assembly according to claim 1, wherein the carrier element is formed from metal and the elastomer element forms a sliding contact seal.

* * * * *